United States Patent [19]

Hapgood et al.

[11] Patent Number: 5,664,904
[45] Date of Patent: Sep. 9, 1997

[54] CLAMPS

[75] Inventors: Robin Hapgood, Bath; David Bland Beckey, Langport, both of England

[73] Assignee: Jani-Jack Limited, Great Britain

[21] Appl. No.: 419,276

[22] Filed: Apr. 10, 1995

[30] Foreign Application Priority Data

Apr. 13, 1994 [GB] United Kingdom ............... 9407259

[51] Int. Cl.$^6$ ........................................ F16B 2/18
[52] U.S. Cl. .............. 403/389; 403/396; 403/322; 248/541; 248/230.4; 285/312
[58] Field of Search ............... 403/385, 386, 403/388, 389, 373, 374, 338, 314, 321, 322, 49, DIG. 9, 396, 391; 248/316.5, 316.2, 230.4, 230.2, 229.23, 229.13, 541; 24/494; 285/311, 312

[56] References Cited

U.S. PATENT DOCUMENTS

| | | | |
|---|---|---|---|
| 1,041,286 | 10/1912 | Hoskins | 403/314 X |
| 1,706,214 | 3/1929 | Davidson | 403/385 |
| 1,918,519 | 7/1933 | Clements | 403/321 X |
| 2,185,782 | 1/1940 | Brittin | 403/396 X |
| 2,304,343 | 12/1942 | Diesback | 248/230.2 X |
| 2,399,681 | 5/1946 | Kemner | 403/373 X |
| 2,477,696 | 8/1949 | Kohnke | 403/385 |
| 2,706,648 | 4/1955 | Gosse | 403/338 X |
| 2,825,591 | 3/1958 | Mulder | 403/374 |
| 3,633,942 | 1/1972 | Meyerhoefer | 285/312 X |
| 4,054,354 | 10/1977 | Neuman | 403/374 X |
| 4,426,171 | 1/1984 | Layner | 403/49 |
| 4,566,819 | 1/1986 | Johnston | 403/385 |
| 4,744,690 | 5/1988 | Hsieh | 403/104 |

FOREIGN PATENT DOCUMENTS

| | | | |
|---|---|---|---|
| 232191 | 1/1961 | Australia | 403/385 |
| 271904 | 10/1963 | Australia | 403/385 |
| 1025783 | 2/1978 | Canada . | |
| 27 03 794 | 1/1977 | Germany . | |
| 9301763 | 2/1993 | Germany . | |
| 124886 | 5/1949 | Sweden | 403/396 |
| 340610 | 10/1959 | Switzerland | 403/385 |
| 1515927 | 6/1978 | United Kingdom | 403/49 |
| 1 596 268 | 8/1981 | United Kingdom . | |

Primary Examiner—Harry C. Kim
Attorney, Agent, or Firm—Jones, Tullar & Cooper, P.C.

[57] ABSTRACT

A clamp for connecting together two parallel elongate members has a pair of body parts with respective recesses that can be brought together to define a through-opening receiving one of the members. To one side of the through-opening each body part has spaced tubular portions with coaxial bores. The tubular portions of the body parts can be meshed together to align their bores and the other of the elongate members inserted through the bores to lock the body parts together axially but allowing them to pivot on the further member. To the opposite side of the through-opening the body parts have snap-fastening recesses that engage a clamping lever. Cam mechanisms between the clamping lever and the body parts allow the body parts to be flexed together by pivoting the lever, so gripping both elongate members and locking them together releasably.

17 Claims, 2 Drawing Sheets

CLAMPS

BACKGROUND OF THE INVENTION

This invention relates to clamps. It is particularly concerned with clamps that can be relatively displaceable along an elongate member embraced by the clamp, to be clamped in different positions to said member without being removed therefrom.

Such clamps are known, e.g. from GB 1596268 and U.S. Pat. No. 4,744,690 but these known clamps have a relatively complicated construction which will be reflected in the costs of manufacture and assembly. Furthermore, these known clamps are limited in their usefulness by the fact that they are designed only to be employed to secure a pair of coaxial telescopic members together.

SUMMARY OF THE INVENTION

According to one aspect of the invention, a clamp is provided for connecting together two mutually offset members, the clamp comprising a body having a through-opening for slidably engaging a first of said members projecting therethrough, a clamping member mounted on said clamp body being displaceable between open and clamping positions, in said clamping position the clamping member drawing together parts of the body to reduce the size of said through-opening, whereby to grip said first member when inserted therein, said parts of the body defining a further opening laterally offset from said through-opening for said first member, said further opening comprising a series of aligned bores in said body parts which include at least one said bore of one part interposed between successive bores of a further part for receiving the second of said mutually offset members, the body parts being relatively pivotable about said other member between the open position in which said second member is slidable in said aligned bores and the clamping position in which the body parts grip both said members to secure them together.

Such a clamp can be arranged to secure together two parallel rod or tube-like members disposed side by side in a releasable manner which allows the relative positions of said members to be easily adjusted.

In another aspect of the invention, by having a clamp that can connect together two mutually offset members, there can be provided an adjustable construction comprising at least one pair of elongate uniform cross-section members disposed side by side and connected together by a clamp which comprises a body formed of a plurality of parts having an opening through which a first of said members projects and a series of aligned bores in at least two said body parts forming a further opening through which the other of said members projects, successive said bores of a first said body part having at least one bore of a second said part interposed between them to lock the parts together axially on said further member, a clamping member on the clamp body connecting said first and second body parts and being displaceable to and from a position in which it draws together the body parts into clamping engagement with said elongate members, the location of said further member in said aligned bores providing a pivot for the first and second body parts to permit them to move to and from the clamping engagement of the elongate members with the displacement of the clamping member to and from said clamping position.

According to a further aspect of the invention, there is provided a clamp for slidably engaging an elongate member, comprising a body having two parts which form complementary portions of a through-opening to receive the elongate member, means for a hinge connection between said body parts to one side of the through-opening, clamping means on an opposite side of said opening from the hinge connection and spanning between said two body parts, said clamping means being displaceable to and from a clamping position in which they draw said two parts closer together about the hinge connection to reduce the size of said opening, whereby to grasp an elongate member inserted therein, said clamping means comprising a one-piece clamping member having projecting elements that releasably engage integral portions of said body parts, said clamping member when engaged with said parts being pivotable from said clamping position to a release position in which the clamping member permits the parts to pivot a limited distance apart from said clamping position.

Preferably the clamping member is arranged to remain connected to both body parts in both the clamping and release positions. The clamp can then remain securely attached to the elongate member when, in the release position, it is able to move freely along the member. It can nevertheless be arranged that the clamping member is detachable from at least one of the body parts, conveniently by a snap-fitting connection, to allow the clamp to be removed easily from the elongate member.

The clamping member is preferably in the form of a manually operable member, such as a lever, to allow adjustment between open and clamping positions without the use of tools. It is also an advantage to provide the clamp with retaining means to hold the clamping member in its clamping position.

An embodiment of the invention will now be described in more detail by way of example, with reference to the accompanying drawings.

DESCRIPTION OF THE PREFERRED EMBODIMENT

The illustrated clamp comprises a main body 2 comprising a pair of opposed parts 2a formed as plastics mouldings intended to grip a first elongate member M1 between them. The body parts 2a are held together by a further elongate member M2 inserted through integral tubular portions 6, the through bores 8 of which are aligned when the two parts are meshed together with one tubular portion of each part held between spaced tubular portions of the other part. Apart from the tubular portions 6, the two body parts 2a are mirror images of each other.

Figure 4:
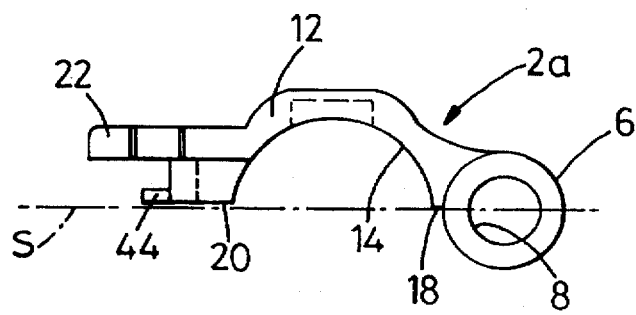
FIG. 4 is an end view of one of the two moulded body parts of clamp body.
Figure 5:
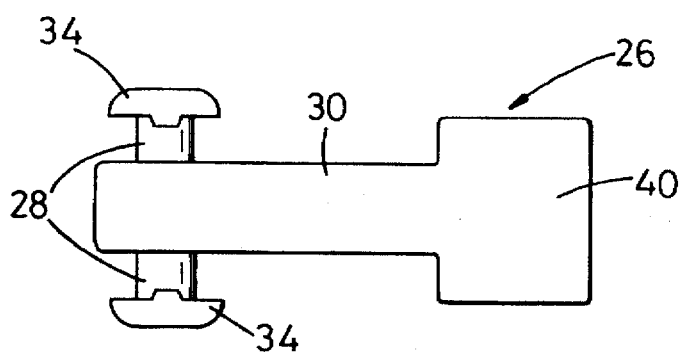
FIGS. 5 and 6 are views from above and below, respectively, of the clamping lever of the clamp.
Figure 6:
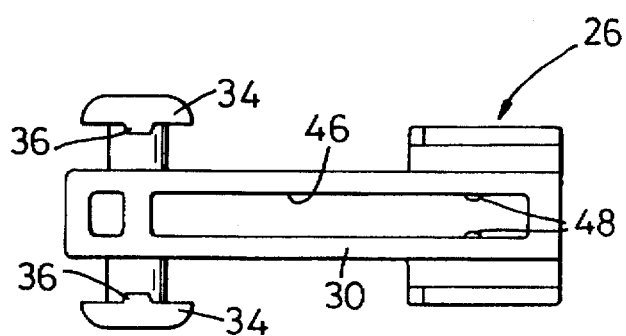

Each body part 2a is formed with a sleeve portion 12 defining a substantially semi-circular recess 14 extending over the length of the body parallel to the hinge pin axis. When the two parts are pivoted together about the aligned bores the recesses define a parallel through-opening receiving the elongate member M1. FIG. 4 shows chain-dotted a plane of symmetry S, when the body parts are closed together, passing diametrically through the cylindrical opening. On the sleeve portions 12 immediately adjacent the tubular portions 6, the body parts have faces 18 which extend to the plane of symmetry S. The diametrically opposite regions of the body parts, however, have opposed faces 20 which remain at a small spacing from the plane of symmetry when the opposed faces 18 come into abutment. In this position, the clamp is arranged to be slidable freely along the member M1.

Adjacent the faces 20, but spaced further from the plane of symmetry, the body parts 2a have wings 22 extending parallel to the faces 20 and provided with open recesses 24 to engage a clamping lever 26. The clamping lever 26 is also a plastics moulding and comprises a pivot pin with cylindrical portions 28 which project to opposite sides of a main arm 30 of the lever. The portions 28 can be snap fitted past restrictions 32 formed at the open ends of the recesses 24 and can then rotate freely when fully inserted. At their outer ends the cylindrical portions 28 are formed with larger diameter caps 34 which, in the open position of the clamp shown in FIG. 1 allow limited free play between the clamping member and the body longitudinally of the clamping member pivot pin.

Figure 1:
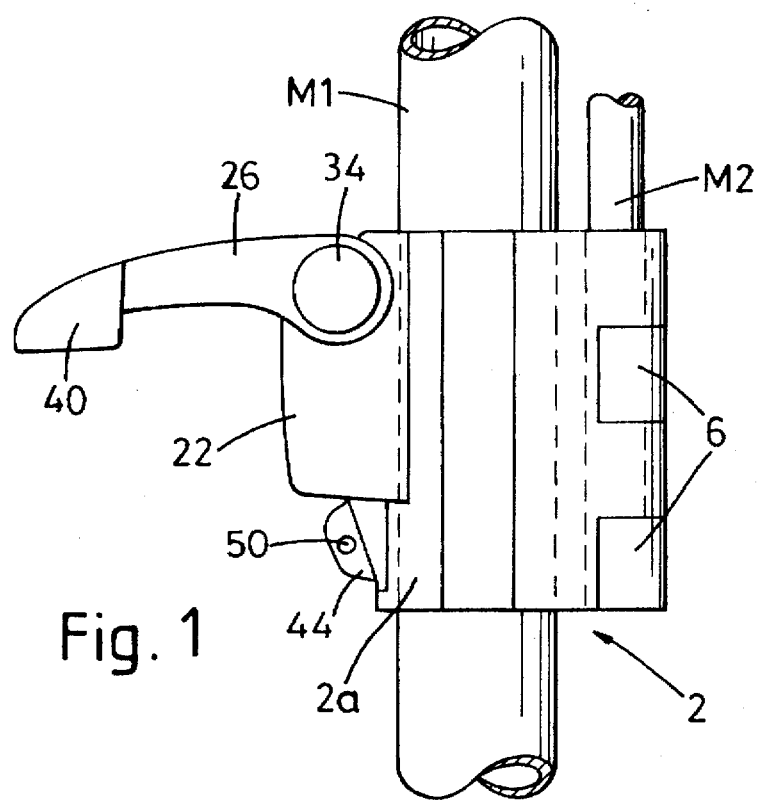
FIGS. 1 and 2 are side views of a clamp according to the invention mounted on a tube or rod, the clamp being in its open or released position in FIG. 1 and in its closed or clamping position in FIG. 2.
Figure 2:
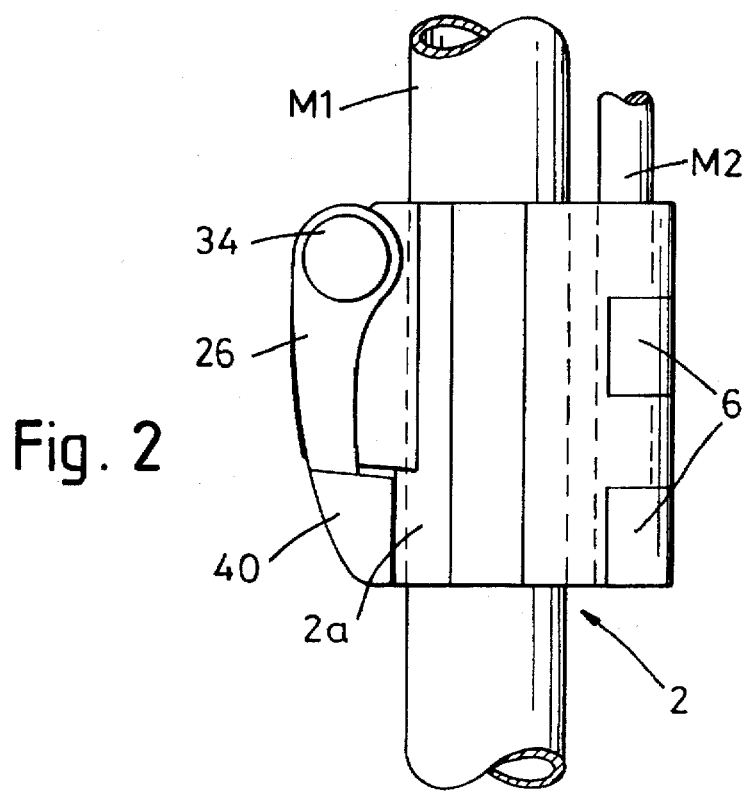
Figure 3:
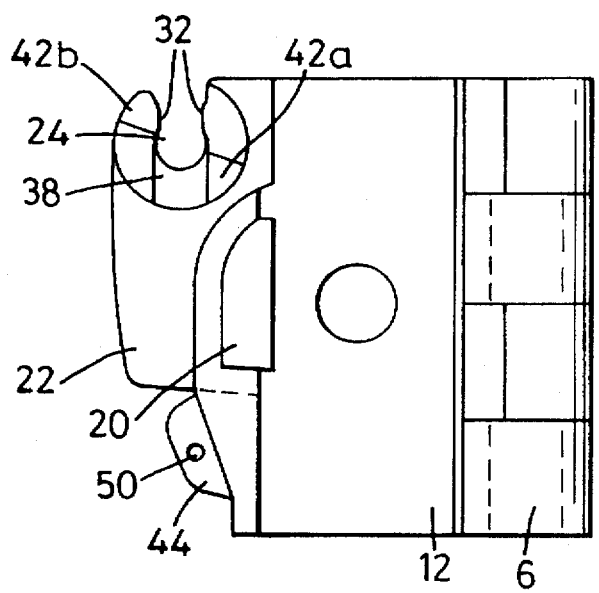
FIG. 3 is a side view of the clamp body, with the clamping lever removed.

The end caps 34 overlie profiled cam surfaces inset into the outer faces of the wings 22 of the body parts and themselves have projections 36 which, in the open position of the clamp shown in FIG. 1, fit freely in shallow slots 38 in the profiled faces. If the lever is rotated downwards using the finger grip 40, towards the position shown in FIG. 2, the projections are swung out of the slots to run over inclined cam surfaces 42a rising from the slots 38 and similarly inclined surfaces 42b on the diametrically opposite tips of the wings 22. As the projections move from the slots 38 to the surfaces 42b they urge the wings 22 closer together. The two body parts 2a are therefore flexed to bring the wings closer to the centre line, and with this the through-opening is reduced in cross-section. By matching the through-opening dimensions to the first elongate member, the latter will be gripped by the clamp.

In the final part of its 90° downwards movement, the clamping lever is brought over spurs 42 on the body parts 2a, which are received in a channel 46 in the lever main arm 30. Pips 48 or similar projections extend from opposite channel walls to engage recesses 50 in the spurs 42 and grip the lever frictionally. The clamp is thereby retained securely in position but the end of the lever is formed so as to allow it to be gripped easily by the fingers and swung upwards again to release the clamp, although it is still held securely on the first elongate member because the clamping member remains engaged in the recesses 24.

Any desired device or member can be attached to the clamp to allow it to be adjustably located with respect to the tube or rod. More specifically, the illustrated further member M2 may itself form a mounting for a device to be so secured, whereby the upward projection of the further member shown in FIGS. 1 and 2 can be a part of such a device or a connecting means therefor, as for positioning a device on a tubular frame.

Thus, the first member M1 may be part of a frame of a trolley, such as the trolleys illustrated in GB 2264088, the subject matter of which is incorporated herein by reference, on which devices such as containers, e.g. for cleaning liquids or tools, are required to be attached in an adjustable manner in order to obtain the maximum flexibility of operation. In such use of the clamps it will usually be convenient to mount one clamp, or more commonly a laterally spaced pair of clamps, on the device, using as the further members M2, rods which may be integral with the devices. With the body parts of the clamps swung apart, the clamps can be positioned against correspondingly spaced vertical tubes of the trolley frame and the body parts closed together to embrace the trolley frame tubes. The clamping levers are then snapped into place and, after making any required adjustment of the height of device on the frame, the levers are swung down to grip the device firmly in place. No drilling or other preparation of the trolley frame is needed and the device can be readily repositioned or removed if required.

It is also possible to employ the clamps in such a way that, to replace a device on the trolley frame, the further members are freely slidable in the body parts of a clamp when the clamp is in the open position so as to allow the device to be removed from the clamps, which may be left on the trolley frame to receive another device.

The illustrated clamps can thus be used in a number of ways to rearrange and replace the devices carried on a trolley frame in a simple and convenient manner which does not require the use of either tools or great physical effort.

Of course, although the foregoing description refers to the clamp being attached by its through-opening to the first elongate member and having a releasable further member to allow alternative devices to be mounted on it, it is possible to arrange that the member on which the body parts pivot is a trolley frame tube which then forms a normally permanent mounting for the clamp, and that replaceable devices are clamped in the through-opening provided by the recesses 14.

We claim:

1. A clamp for connecting together two mutually offset members, comprising: a body formed of a plurality of parts, a through-opening provided in said body by said body parts for slidably engaging a first of the two mutually offset members projecting therethrough, a clamping member spanning the body parts and having limited displacement thereon between respective end positions, one end position being a clamping position for the body parts and the other end position being a release position for the body parts, and there being retaining means for holding the clamping member in said clamping end position, the clamping member drawing together said parts of the body to reduce the size of said through-opening whereby to grip the first offset member when inserted therein, a series of aligned bores in said body parts providing a further opening for receiving the second offset member laterally offset from said through-opening for the first member, said further opening comprising at least a first of said bores in a first of said body parts interposed between successive bores of a second of said body parts when the second offset member is received therein, the body parts being relatively pivotable on said aligned bores by said clamping member between the release position in which the second offset member is slidable in said aligned bores and the clamping position in which the body parts grip both of the two offset members to secure them together.

2. A clamp according to claim 1, wherein the clamping member is displaceable on the body between opposite end positions of adjustment, in one of said positions the body parts being drawn together in the clamping position and in the other of said positions the body parts being in the release position in which the clamping member remains connected between the body parts with the clamping force released, whereby the clamp slidably surrounds the offset members in the release position.

3. A clamp according to claim 1, wherein said second body part has a plurality of axially spaced portions containing said successive bores and said first body part has a portion locatable between said spaced portions and containing said first bore aligned with the bores of said spaced portions to form therewith said further opening, whereby the two body parts are attached together for sliding movement on the second offset member when the body portions are in said release position.

4. A clamp according to claim 1 wherein complementary recesses in the body parts form said through-opening for the first member.

5. A clamp according to claim 1 wherein the clamping member is detachable from at least one of the body parts.

6. A clamp according to claim 1 wherein the clamping member is in the form of a manually operable member.

7. A clamp according to claim 1 further comprising snap-fit engagements between the clamping member and the clamp body.

8. A clamp for slidably engaging an elongate member, having a body comprising two body parts, a through-opening formed by complementary portions of said two body parts to receive the elongate member, means of said body for a hinge connection between said body parts to one side of the through-opening formed by said body parts, clamping means on an opposite side of said through-opening from the hinge connection and spanning between said two body parts, said clamping means being displaceable to and from a clamping position, in said clamping position said clamping means drawing together said two parts about the hinge connection to reduce the size of said through-opening for grasping the elongate member when inserted therein, said clamping means comprising a one-piece clamping member, projecting elements of said one-piece member for engagement with the body parts and an integral portion of each said body part being releasably engaged by a respective one of said elements, when said elements are engaged with said integral portions said clamping member being pivotable on said body portions from said clamping position to a release position in which the clamping member permits the parts to pivot a limited distance apart from said clamping position.

9. A clamp according to claim 8 wherein the clamping member is arranged to remain connected to said integral portions of the body parts in both the clamping and release positions.

10. A clamp according to claim 8 wherein each said complimentary portion of said body parts is formed with a recess extending parallel to the hinge connection, said recesses together forming said through-opening.

11. A clamp according to claim 8 wherein the clamping member is detachable from at least one of the body parts.

12. A clamp according to claim 8 wherein the clamping member is in the form of a manually operable member.

13. A clamp according to claim 8 further comprising retaining means to hold the clamping member in its clamping position.

14. An adjustable construction comprising at least one pair of elongate uniform cross-section members disposed side by side and a clamp connecting said members together, said clamp comprising a body formed of a plurality of parts, an opening in said body through which a first of said members projects and a series of aligned bores in at least two said body parts forming a further opening through which a second of said members projects, successive said bores of one of said at least two body parts having at least one bore of another of said parts interposed between them, whereby to lock the parts together axially on said second member, a clamping member spacing said at least two body parts and having limited displacement thereon between respective end positions, one being a clamping position in which it draws together said body parts into clamping engagement with said pair of elongate members, the other end position being a release position for the body parts, and there being retaining means for holding the clamping member in its clamping end position, the location of said second member in said aligned bores providing a pivot for said at least two body parts to permit them to move to and from the clamping engagement of the elongate members with the displacement of the clamping member to and from said clamping position.

15. A clamp for slidably engaging an elongate member, the clamp having a body comprising two body parts, a through-opening formed by complementary portions of said two body parts to receive the elongate member, means on said body for a hinge connection between said body parts to one side of the through-opening formed by said body parts, clamping means on an opposite side of said through-opening from the hinge connection and spanning between said two body parts, said clamping means being displaceable to and from a clamping position, in said clamping position said clamping means drawing together said two parts about the hinge connection to reduce the size of said through-opening, for grasping the elongate member when inserted therein, said clamping means comprising a one-piece clamping member, coaxial elements of said one-piece clamping member projecting to opposite sides thereof and integral portions of said body parts providing a pivot mounting releasably engaged by said coaxial elements whereby the clamping member can be engaged with both said body parts and pivoted thereon, said clamping member when engaged with said parts being pivotable on said integral portions from said clamping position to a release position in which the clamping member permits the parts to pivot a limited distance apart from said clamping position.

16. A clamp for slidably engaging an elongate member, said clamp having a body comprising two body parts, a through-opening formed by complementary portions of said two body parts to receive the elongate member, means on said body for a hinge connection between said body parts to one side of the through-opening formed by said body parts, clamping means on an opposite side of said through-opening from the hinge connection and spanning between said two body parts, said clamping means being displaceable between clamping and release positions, in said clamping position said clamping means drawing together said two parts about the hinge connection to reduce the size of said through-opening, for grasping the elongate member when inserted therein, said clamping means comprising a one-piece clamping member having projecting elements for engaging with the body parts, the body parts having respective snap-fitting engagement elements forming coaxial mountings receiving the respective projecting elements of the clamping member formed in the body parts, the clamping member being pivotable between the clamping and release positions while mounted in said snap-fitting engagements, the clamping member permitting the body parts to pivot a limited distance apart from said clamping position when in said release position.

17. A clamp according to claim 16 further comprising retaining means to hold the clamping member in its clamping position.

* * * * *